JAMES B. VANN, OF ELYTON, ALABAMA.

Letters Patent No. 86,331, dated January 26, 1869.

IMPROVED MEDICAL COMPOUND.

The Schedule referred to in these Letters Patent and making part of the same.

*To all whom it may concern:*

Be it known that I, JAMES B. VANN, of Elyton, in the county of Jefferson, and State of Alabama, have discovered and invented a new Combination of Matter for a Medicine for the cure of chills and fever, bilious fever, liver-complaints, dyspepsia, night-sweats, and all diseases arising from a bilious state of the system.

These bitters are composed of the following ingredients, viz:

Four ounces willow-bark; four ounces wild-cherry bark; two scruples pulverized gentian; two scruples pulverized columbo.

Mix in one gallon water, and boil to three pints. When cool, add one gallon of diluted alcohol; then add one fluid ounce compound spirits of lavender, and twenty drops oil of anise.

What I claim as my invention, and desire to secure by Letters Patent, is—

The combination of the above ingredients as a medicine and bitters, for the cure of the diseases above mentioned.

JAMES B. VANN.

Witnesses:
  M. B. MAY,
  R. H. HAGOOD.